(12) United States Patent
Rogoschewsky (10) Patent No.: US 10,709,145 B2
(45) Date of Patent: Jul. 14, 2020

(54) ADAPTER DEVICE FOR COUPLING A CONSTRUCTION HEATER TO AN EXISTING GRAIN BIN AERATION FAN

(71) Applicant: 102055301 Saskatchewan Ltd, Saskatoon (CA)

(72) Inventor: Steven Rogoschewsky, Saskatoon (CA)

(73) Assignee: Adaptive Agriculture Solutions Inc., Saskatoon (CA)

(*) Notice: Subject to any disclaimer, the term of this patent is extended or adjusted under 35 U.S.C. 154(b) by 14 days.

(21) Appl. No.: 16/206,172

(22) Filed: Nov. 30, 2018

(65) Prior Publication Data

US 2020/0077671 A1    Mar. 12, 2020

(51) Int. Cl.
| | | |
|---|---|---|
| *A23B 9/08* | (2006.01) | |
| *F26B 9/10* | (2006.01) | |
| *F26B 19/00* | (2006.01) | |
| *A01F 25/22* | (2006.01) | |

(52) U.S. Cl.
CPC ............... *A23B 9/08* (2013.01); *F26B 9/103* (2013.01); *F26B 19/00* (2013.01); *A01F 25/22* (2013.01); *F26B 2200/06* (2013.01)

(58) Field of Classification Search
CPC . A23B 9/08; F26B 9/103; F26B 19/00; F26B 2200/06; A01F 25/22
USPC .......................................................... 34/168
See application file for complete search history.

(56) References Cited

U.S. PATENT DOCUMENTS

| | | | | |
|---|---|---|---|---|
| 1,330,195 | A * | 2/1920 | Kuhn ...................... | F26B 9/103 34/233 |
| 2,466,362 | A * | 4/1949 | Blake ...................... | F26B 9/103 454/180 |
| 3,501,845 | A * | 3/1970 | Sietmann ............... | F26B 25/002 34/498 |
| 5,960,558 | A * | 10/1999 | Bourgault ............... | F26B 9/063 34/491 |
| 6,158,143 | A * | 12/2000 | Da Cunha ............. | F26B 17/122 34/167 |
| 6,202,319 | B1 * | 3/2001 | Bening .................. | F26B 17/122 34/165 |
| 7,818,894 | B2 * | 10/2010 | Noyes .................... | F26B 17/122 34/169 |
| 8,356,420 | B2 * | 1/2013 | Morrison ............... | F26B 17/124 209/134 |
| 8,561,315 | B2 * | 10/2013 | Thompson .............. | F26B 23/10 34/93 |

(Continued)

FOREIGN PATENT DOCUMENTS

| | | | | |
|---|---|---|---|---|
| CA | 2999815 | A1 * | 4/2017 | ............ F26B 21/004 |
| CA | 2886040 | C * | 8/2018 | .............. F26B 9/063 |

(Continued)

*Primary Examiner* — Stephen M Gravini
(74) *Attorney, Agent, or Firm* — Kyle R Satterthwaite; Ryan W Dupuis; Ade & Company Inc (57) ABSTRACT

An apparatus for connecting a heater to a grain bin aeration fan features a multi-piece adapter device having a connection adapter with inlets for receiving flexible ducts from a heater. The connection adapter can be used on its own to directly interface with a grain bin aeration fan of a first size, or can be used in combination with a cooperative sizing adapter to adjust an effective outlet size of the adapter to better fit a grain bin aeration fan of a different second size. An ambient air intake in the connection adapter entrains ambient air into the heated air stream.

20 Claims, 8 Drawing Sheets

(56) References Cited

U.S. PATENT DOCUMENTS

| | | | |
|---|---|---|---|
| 9,506,693 B2 * | 11/2016 | Pauling | F26B 17/122 |
| 10,378,820 B2 * | 8/2019 | Heilskov | F26B 3/14 |
| 2018/0288941 A1 * | 10/2018 | Bresler | A01F 25/22 |
| 2019/0293350 A1 * | 9/2019 | Bell | F26B 19/005 |

FOREIGN PATENT DOCUMENTS

| | | | | |
|---|---|---|---|---|
| WO | WO-2011152855 A1 * | 12/2011 | | F26B 23/10 |
| WO | WO-2017060823 A1 * | 4/2017 | | A01F 25/14 |

* cited by examiner

ADAPTER DEVICE FOR COUPLING A CONSTRUCTION HEATER TO AN EXISTING GRAIN BIN AERATION FAN

CROSS-REFERENCE TO RELATED APPLICATIONS

This application claims benefit under 35 U.S.C. 119(A) of Canadian Patent Application No. 3,016,973, filed Sep. 10, 2018, the entirety of which is incorporated herein by reference.

FIELD OF THE INVENTION

The present invention relates generally to equipment and techniques for drying stored grain, and more particularly to solutions for in-situ heated aeration of a grain bin.

BACKGROUND

For some time, farmers have had the option of purchasing grain drying equipment, which typically requires the movement of grain from a standard storage bin into a larger (dedicated) grain dryer system. Pre-owned systems can sometimes be acquired for about $20,000, while others can reach or exceed $100,000.

As an alternative to such high cost equipment, farmers have been exploring the use of diesel or propane construction heaters to add heat to their existing unheated grain bins. Available commercial heaters of this type include those marketed by Frost Fighter Inc., Flagro Industries Ltd., and Aerotech Herman Nelson International Inc. One challenge faced is the need for an ad hoc method of directing the heated air from the heater into the grain bin. For bins that contain ground level aeration fans, one solution has been to construct a box over the fan for the purpose of mixing the heated air with ambient outside air. Without particular control over the drying conditions, there's the potential for harm caused by overheating or over-drying, plus potential for significant operating inefficiencies, particularly if the construction heaters are operated in a continuous heating mode, thus burning more fuel than necessary to obtain optimal drying conditions.

As another alternative, a grain dryer product known as the Air-O-Matic pre-heater can be coupled to a large diameter flex-duct, whose end is fit over the circular intake end of the cylindrically shaped housing of an axial or inline centrifugal bin aeration fan, while a thermostat controls cycling of the heater. However, the end of the flexible duct is not compatible with side-intake centrifugal fans, thus again leaving the ad-hoc challenge of how to direct heated air into the aeration fan.

Accordingly, there remains room for improvements and alternatives in the field of heated grain bin aeration.

SUMMARY OF THE INVENTION

According to a first aspect of the invention, there is provided, in combination, a multi-outlet heater, a grain bin aeration fan, a plurality of flexible ducts connected or connectable to respective outlets of the heater, and an adapter device having a front end at which a plurality of inlets are configured and compatibly sized relative to the flexible ducts for selective and respective connection of the plurality of flexible ducts thereto from the respective outlets of the multi-outlet heater, and an outlet end sized and configured for placement over an intake of the grain bin aeration fan.

Preferably a front face of the adapter device partially closes off the front end thereof and has different areas thereof respectively occupied by the inlets, and each inlet overlies a respective portion of a shared opening in said front face of the adapter device.

Preferably the inlets collectively occupy a less than entirety of said shared opening, an unoccupied area of which at least partially defines an ambient air intake of the adapter device.

Preferably the front face of the adapter device has at least one additional opening therein at one or more regions thereof that are separate and distinct from the shared opening, and are unoccupied by the inlets to admit ambient air through said additional opening.

Preferably each inlet comprises a round connection flange protruding from the front face of the adapter device, each connection flange spanning around a respective inlet opening in said front face and being sized for receipt of an end of a respective one of the flexible heating ducts.

In the instance of the shared opening, the inlet opening of each inlet is the respective portion of the shared opening.

Preferably the adapter device comprises a tapered section that narrows in width toward the outlet end.

Preferably the tapered section is conically tapered.

Preferably the tapered section defines the outlet end of the adapter device.

Preferably each inlet has an inlet diameter corresponding to a predetermined size of flexible ducts, and a sum of the inlet diameters exceeds a diameter of the adapter device at the outlet end thereof.

The adapter device may be of a multi-piece structure comprising a connection adapter that defines the front end, and a discrete sizing adapter that defines the outlet end.

Preferably the connection adapter has an outer diameter that exceeds a diameter of the sizing adapter at the outlet end.

Preferably a proximal end of the sizing adapter situated oppositely of the outlet end of the adapter device is received or receivable in a rear end of the connection adapter situated oppositely of the front end.

Preferably the connection adapter and the sizing adapter are matable together in a self-locking manner free of any external fasteners.

The sizing adapter may feature air intake holes therein to admit ambient air into the sizing adapter as heated air flows therethrough, for example to supplement any such ambient air also admitted into the connection adapter if an ambient air intake is included therein.

Preferably there are provided one or more flexible securing members by which the adapter device is securable to the grain bin aeration fan.

Preferably said one or more flexible securing members comprise one or more ratchet straps.

According to a second aspect of the invention, there is provided a method of providing differently sized adapter products for connecting portable heaters to air intakes of differently sized grain bin aeration fans, said method comprising: (a) manufacturing or acquiring:
a plurality of connection adapters each having:
a front end equipped with at least one inlet for selective connection of a respective flexible duct thereto from a heater in order to convey heated air from said heater to said inlet; and a rear end situated oppositely of said front end and having a rear opening in fluid communication with each inlet to enable exhaust of said heated air from the connection adapter through said rear opening; and a plurality of sizing adapters each having:

a proximal end configured for selective coupling with the rear end of the connection adapter in a working position, said proximal end having a proximal opening that is positioned to fluidly communicate with an interior space of the connection adapter when in the working position; and a distal end situated oppositely of the proximal end and having a distal opening that fluidly communicates with the proximal opening to enable flow of the heated air through the sizing adapter from the interior space of the connection adapter when in the working position, the distal opening of the sizing adapter being of different diameter than the rear opening of the connection adapter; and (b) from the manufactured or acquired adapters, compiling different adapter options for different sizes of grain bin aeration fans, said different adapter options including at least two of the following:

(i) a first single-piece adapter comprising a connection adapter unaccompanied by any of the sizing adapters, wherein the rear opening of the connection adapter is compatibly sized relative to the air intake of a first size of grain bin aeration fan;

(ii) a second multi-piece adapter comprising a connection adapter accompanied by a sizing adapter whose distal opening is compatibly sized relative to the air intake of a different second size of grain bin aeration fan; and (iii) a third multi-piece adapter comprising a connection adapter accompanied by a different sizing adapter whose distal opening is compatibly sized relative to the air intake of a different third size of grain bin aeration fan.

Preferably the distal opening of each sizing adapter is of lesser diameter than the rear opening of each connection adapter.

Preferably the rear opening of each connection adapter is of greater diameter than each inlet at the front end thereof.

Preferably the at least one inlet of at least one of the connection adapters comprises two inlets.

Preferably the two inlets have respective inlet diameters, and a diameter of the rear opening of said at least one of the connection adapters equals or exceeds a sum of said inlet diameters.

According to a third aspect of the invention, there is provided, in combination, a heater, a grain bin aeration fan, at least one flexible duct connected or connectable to a respective outlet of the heater, and an adapter device having a front end at which at least one inlet is configured for selective and respective connection of the flexible duct thereto from the respective outlet of the heater, and an outlet end for placement in working relation to an intake of the grain bin aeration fan, wherein the adapter device further comprises at least one ambient air intake by which ambient air is admissible into the adapter device to supplement heated air from the heater.

Preferably the adapter device comprises a front face partially closing off the front end thereof, and an inlet-occupied opening in said front face, at least one portion of which is respectively occupied by the at least one inlet, and the ambient air intake comprises at least one unoccupied area of said inlet-occupied opening that is unoccupied by the at least one inlet.

The front face of the adapter device may have at least one additional opening therein at one or more areas thereof that are separate and distinct from the inlet-occupied opening, and are unoccupied by the at least one inlet.

Preferably the at least one inlet comprises two inlets and the inlet-occupied opening is a shared opening, portions of which are respectively occupied by the two inlets.

According to a fourth aspect of the invention, there is provided an apparatus for connecting a heater to a grain bin aeration fan, said apparatus comprising an adapter device having a front end at which at least one inlet is configured for selective of a respective flexible duct from a respective outlet of the heater, and an outlet end for placement in working relation to an intake of the grain bin aeration fan, wherein the adapter device comprises a front face partially closing off the front end thereof, and each inlet comprises a respective inlet opening passing through said front face and a flange that projects from said front face around the respective inlet opening and is sized for receipt of an end of the respective flexible duct.

BRIEF DESCRIPTION OF THE DRAWINGS

One embodiment of the invention will now be described in conjunction with the accompanying drawings in which.

DETAILED DESCRIPTION

Figure 9:
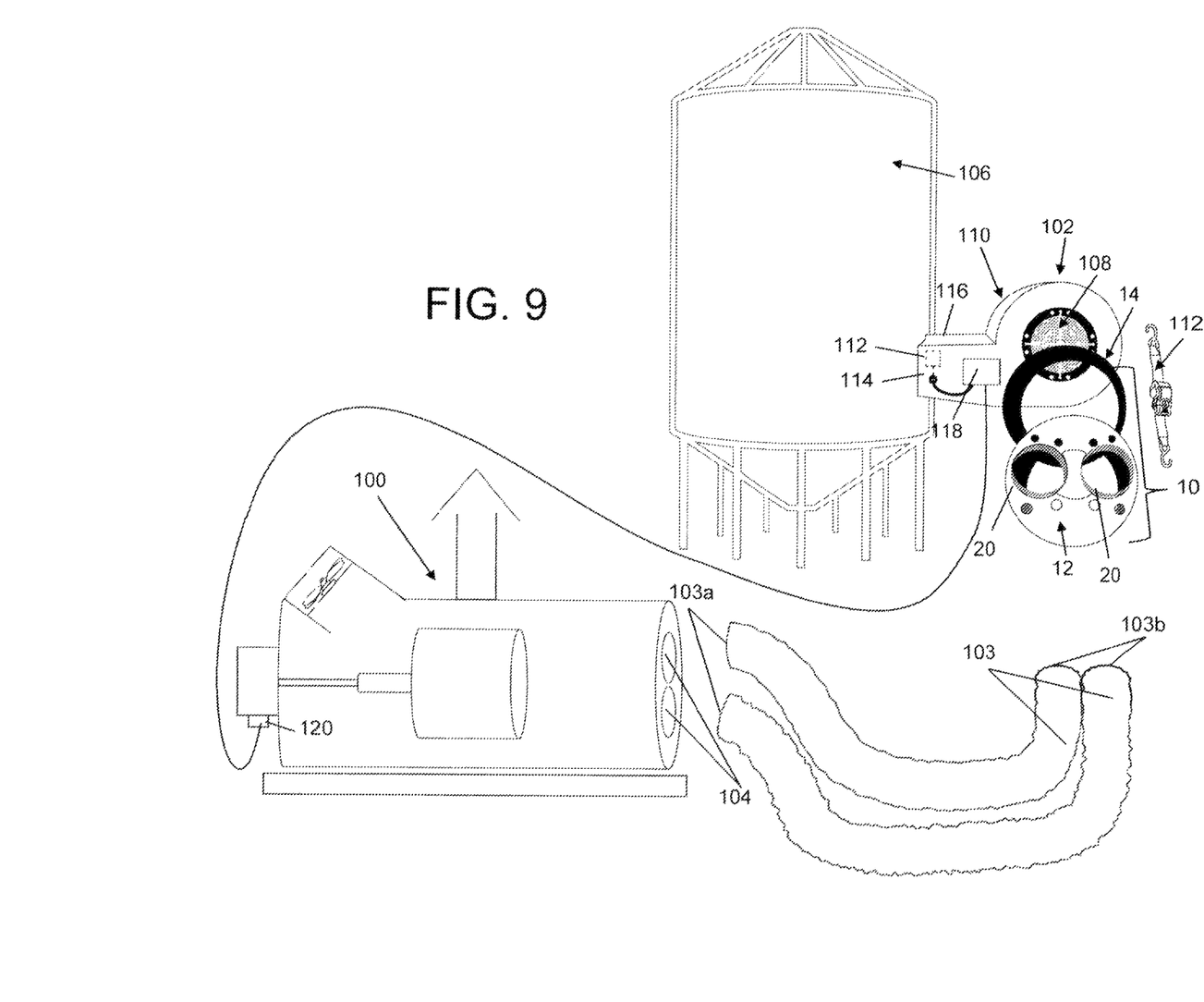
FIG. 9 is a schematic illustration demonstrating use of the adapter device of FIG. 1 to connect a portable construction heater to a side-intake centrifugal aeration fan of a grain bin.
Figure 10:
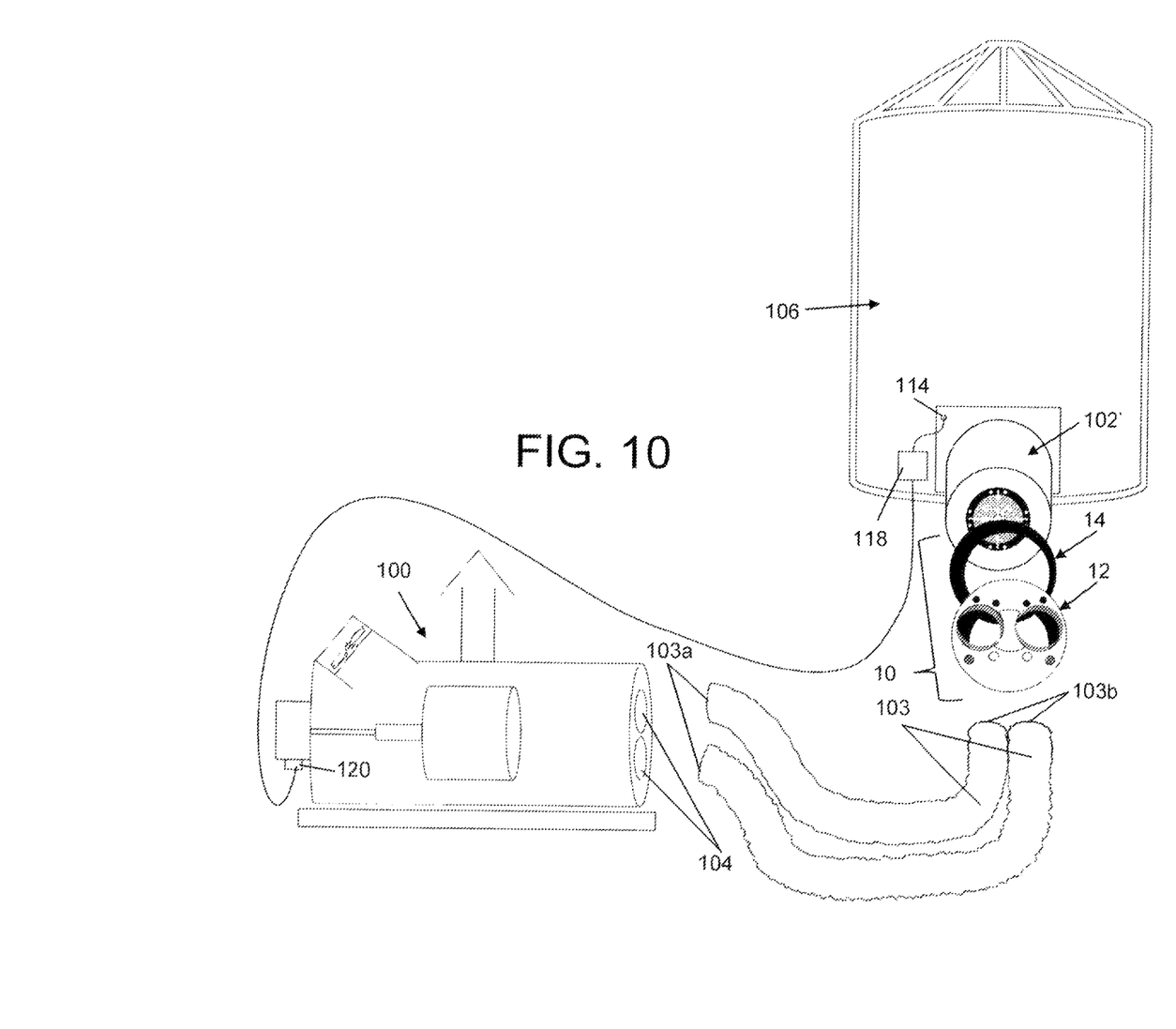
FIG. 10 is a schematic illustration demonstrating use of the adapter device of FIG. 1 to connect a portable construction heater to an axial or in-line centrifugal aeration fan of a grain bin.

FIGS. 1 through 8 of the drawings show an inventive two-piece adapter device 10 that is useful to connect a dual-outlet portable construction heater 100 to the ambient air intake of an existing grain bin aeration fan, which may be a side-intake centrifugal fan 102 like that shown in FIG. 9, or an end-intake fan 102' (whether an axial, or in-line centrifugal fan) like that of FIG. 10. FIGS. 1, 2, 9 and 10 show the two constituent pieces of the adapter device 10 in an exploded state prior to assembly thereof, while FIGS. 3 through 8 show the two constituent pieces in an assembled state. The first constituent piece of the device is referred to herein as a connection adapter 12, as it is the component of the device to which flexible ducts 103 routed from the outlets 104 of the construction heater 100 are connected during installation of the device at the grain bin location. The second constituent piece is referred to herein as a sizing adapter 14, as it is the component of the device that enables adaption thereof to suit different sizes of grain bin aeration fans, thereby providing a relatively universal solution by which the heater can be operably connected to a variety of different fan models from various fan manufacturers.

Figure 1:
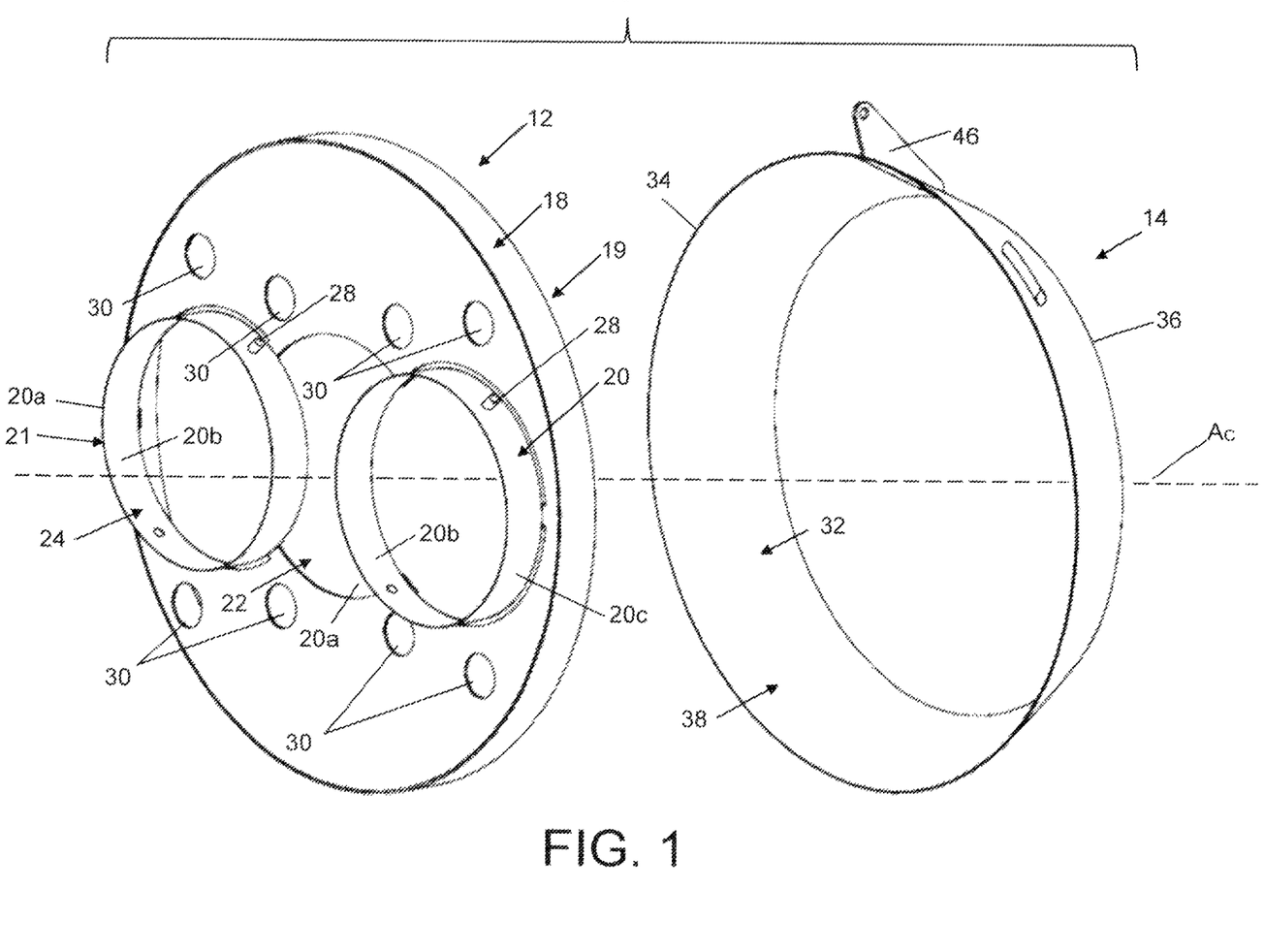
FIG. 1 is an exploded front perspective view of a two-piece adapter device of the present invention for coupling a portable construction heater to a grain bin aeration fan.
Figure 2:
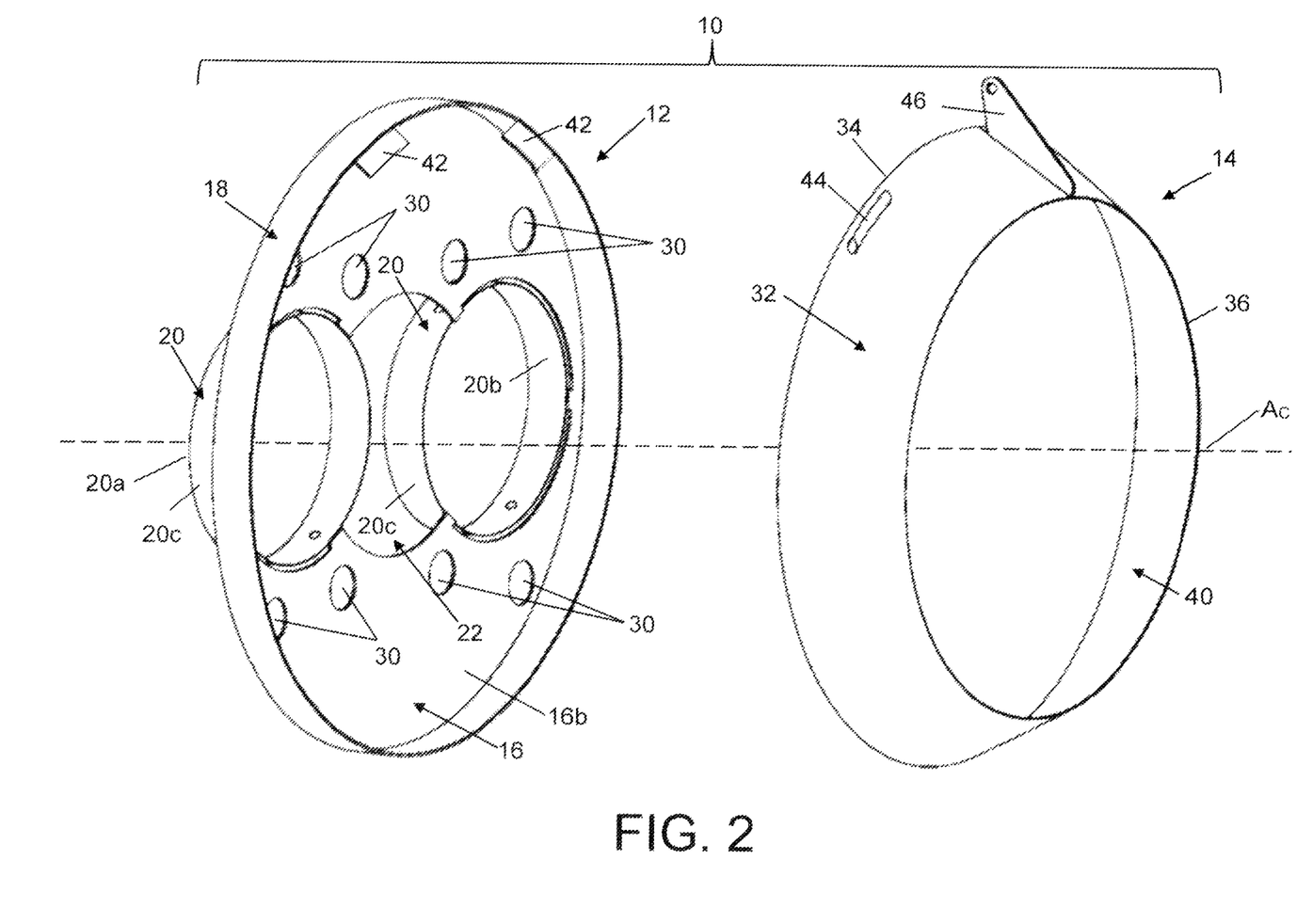
FIG. 2 is an exploded rear perspective view of the adapter device of FIG. 1.
Figure 3:
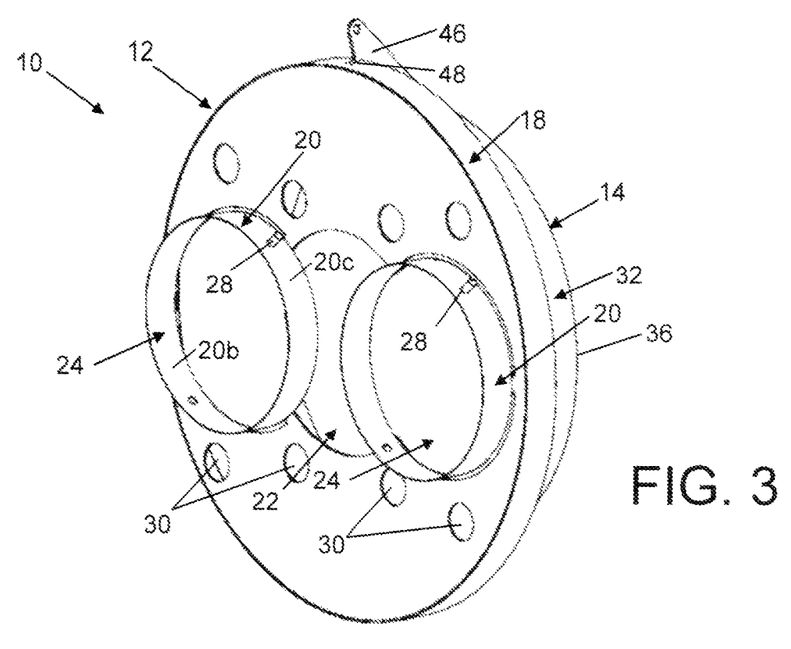
FIG. 3 is an assembled front perspective view of the adapter device of FIG. 1.
Figure 4:
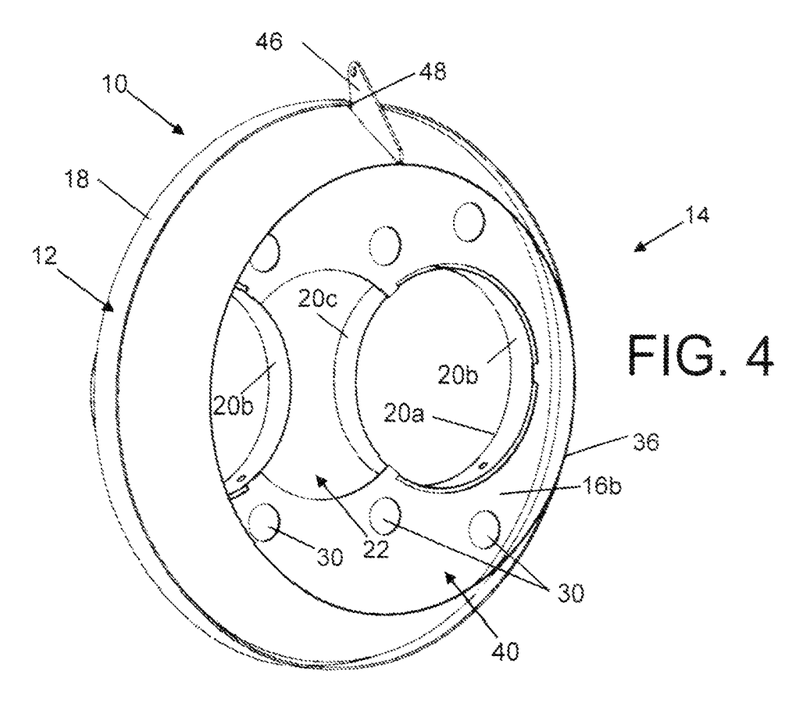
FIG. 4 is an assembled rear perspective view of the adapter device of FIG. 1.

The connection adapter 12 of the illustrated embodiment features a flat face plate 16 having a front face 16a, an opposing rear face 16b and a circular outer perimeter. A circumferential wall 18 protrudes rearwardly from the rear face 16b of the face plate 16 around the entire circular perimeter thereof. A terminal end 18a of this wall resides in a plane parallel to that of the face plate at a short distance rearwardly outward therefrom. This plane denotes a terminal rear end 19 of the connection adapter 12.

Figure 5:
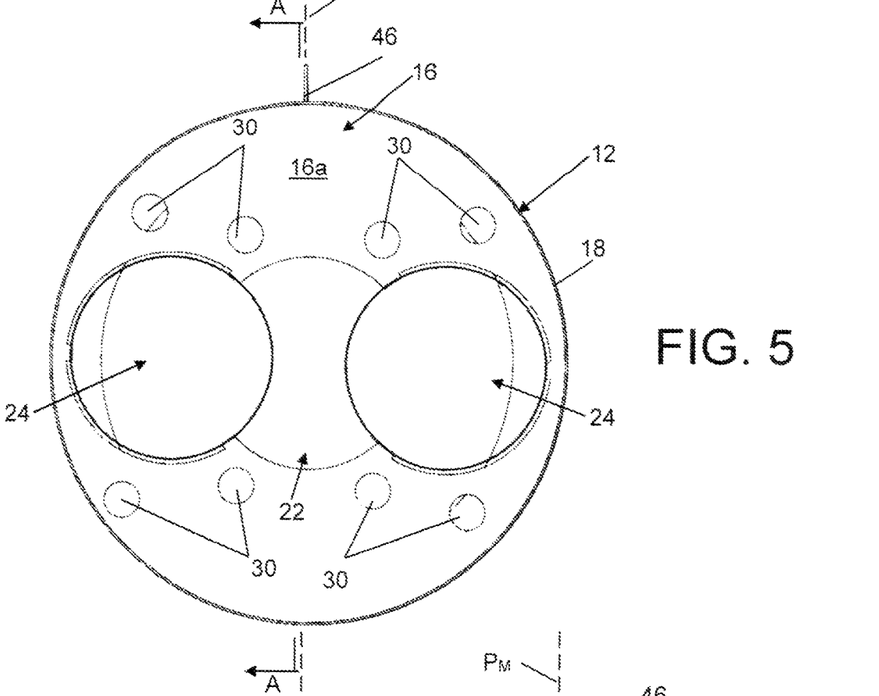
FIG. 5 is an assembled front elevational view of the adapter device of FIG. 1.
Figure 6:
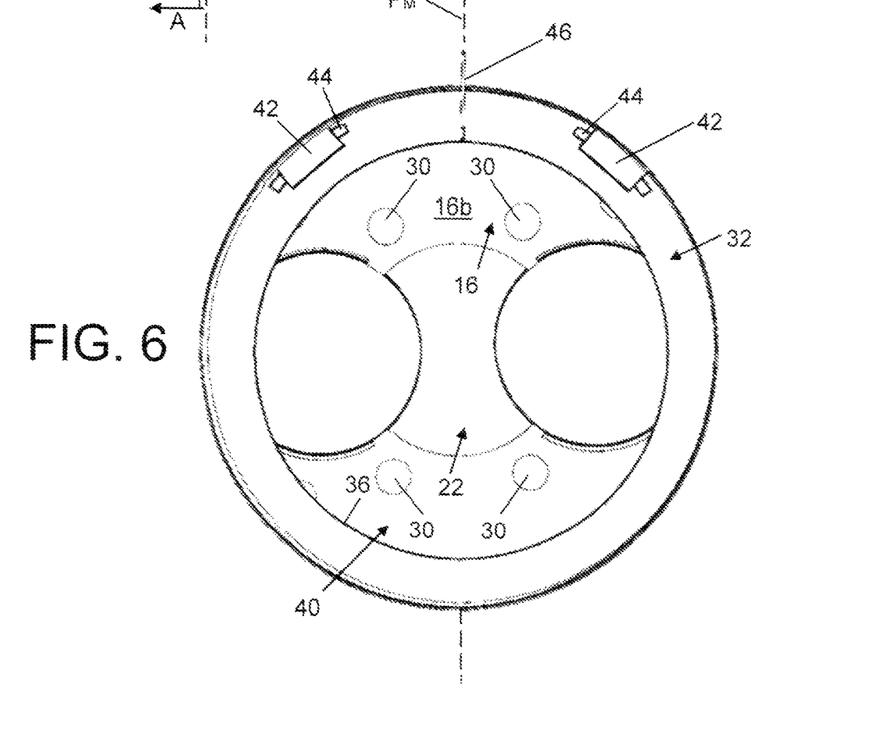
FIG. 6 is an assembled rear elevational view of the adapter device of FIG. 1.
Figure 7:
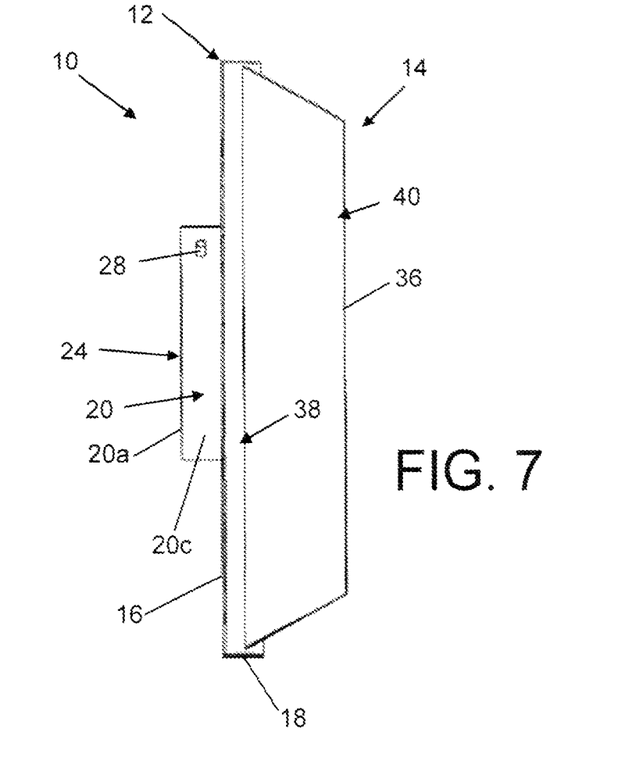
FIG. 7 is a cross-sectional view of the adapter device of FIG. 5 as viewed along line A-A thereof.
Figure 8:
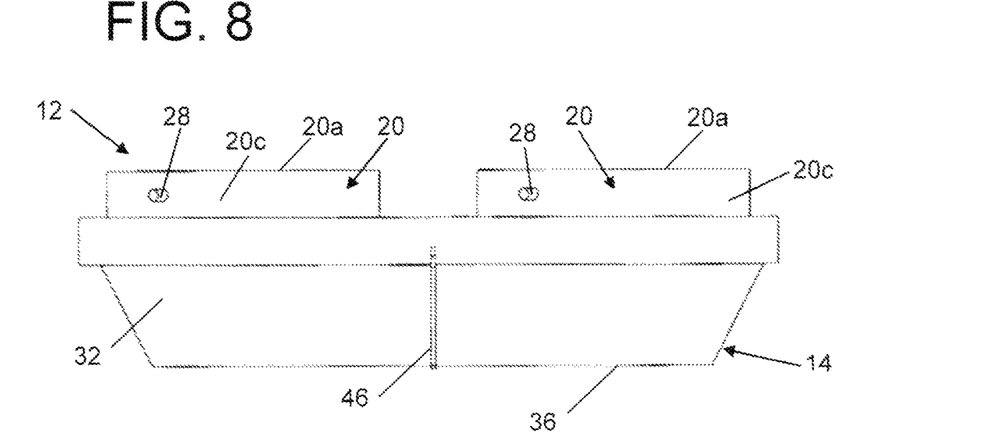
FIG. 8 is an assembled top plan view of the adapter device of FIG. 1.

Two connection flanges 20 protrude forwardly from the front face 16a of the face plate 16, each spanning a circular path around a respective reference axis $A_R$ lying parallel to a central longitudinal axis $A_L$ that perpendicularly intersects the plane of the face plate 16 at a center-point thereof. The two reference axes lie in symmetric relation to one another across a mid-plane $P_M$ in which the central longitudinal axis resides, whereby the two reference axes are equidistant from the mid-plane and central longitudinal axis. The terminal ends 20a of the connection flanges reside in a common plane situated parallel to that of the face plate at a short distance forwardly outward therefrom. This plane denotes a terminal front end 21 of the connection adapter 12.

The face plate 16 has a large primary opening 22 therein, the shape of which resembles three overlapping circular areas of equal diameter. Of these three circular areas, a central circular area is centered on the central longitudinal axis $A_L$, while two outer circular areas are each centered on a respective one of the reference axes $A_R$. The distance from the center of the center circular area to the center of each outer circular area exceeds the radial measure of each circular area, whereby each outer circular area overlaps only the central circular area, and not the other outer circular area. The radial measure from each reference axis $A_R$ to the inside surface 20a of the respective connecting flange 20 is equal and coincident with the radial measure of the respective outer circular area that is also centered on that reference axis. The respective space delimited by each connecting flange 20 is referred to herein as an inlet opening 24, as it is through these inlet openings 24 that hot air from the construction heater enters the device 10 at the front end 21 thereof during use of the adapter device to feed such hot air to the aeration fan of a grain bin.

Due to the aforementioned geometric layout of the primary opening 22 and connection flanges 20, each inlet opening 24 overlies a respective one of the primary opening's outer circular areas in coincidentally aligned relation therewith on the respective reference axis $A_R$. The arcuate portions of the two connecting flanges 20 that cut across the central circular area of the primary opening 22 truncate this central circular area of the primary opening. The resulting truncated central area of the primary opening 22 has a shape resembling that of a double-sided axe. In other words, the truncated central area is the result of subtraction of a less than hemispherical segment of each outer circular area from the central circular area.

The space delimited by the circumferential wall 18 of the connection adapter 12 at the terminal rear end 19 thereof is referred to herein a rear opening 26 of the connection adapter 12. The circumferential wall 18 is cylindrical in shape, thus having a uniform diameter over the full length of its perpendicular projection from the rear face 16b of the face plate 16. Accordingly, the diameter of the rear opening 26 is equal to the diameter of the face plate 16, and exceeds the sum of the diameters of the two inlet openings 24. The two connecting flanges 20 and the two inlet openings 24 delimited thereby are equal to one another in size, whereby the sizing of the rear opening 26 can alternatively be expressed as more than twice the diameter of either inlet opening 24, or more than twice the diameter of either outer circular area of the primary opening 22. In one embodiment, the diameter of each inlet opening 24 (i.e. the inner diameter of each connecting flanges 20) is approximately 12-inches, thereby providing compatibility with commercially available flexible heater ducting of a standardized size compatible with 12-inch hot air outlets of commercially available portable construction heaters. The rear opening 26 of the connection adapter 12 in one embodiment is between 28 and 30 inches, thus exceeding twice the 12-inch inlet diameter, and for example measuring approximately 29 inches in one particular embodiment.

Figure 11:
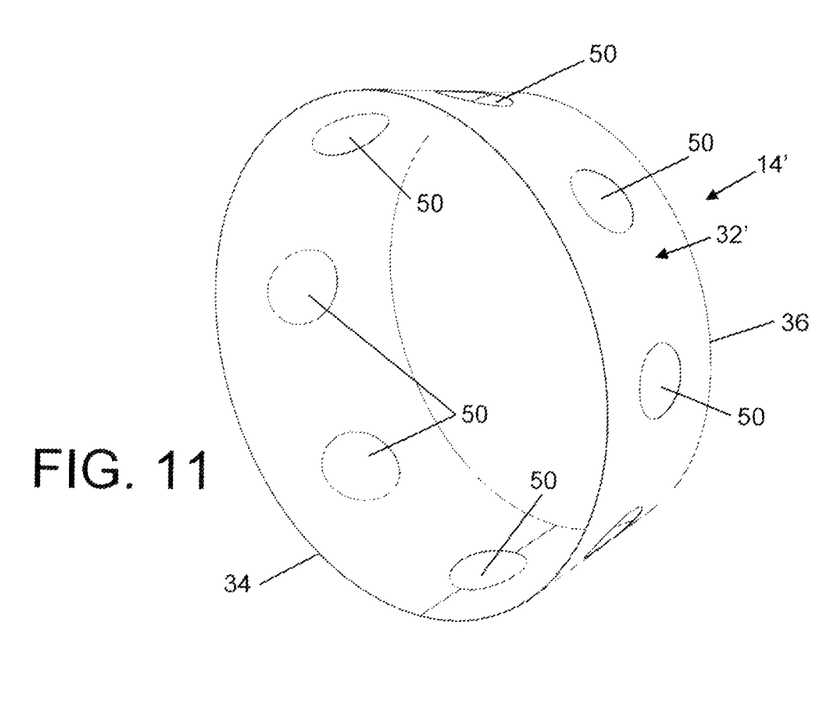
FIG. 11 is a front perspective view showing a variant of a sizing adapter of the two piece adapter from FIGS. 1 through 7.

To connect both hot air outlets of a dual-outlet portable construction heater to the adapter device 10, two flexible heater ducts 103 each have one end 103a thereof fitted onto a respective outlet of the heater, and the other end 103b fitted over a selected one of the connection adapter's two connection flanges 20, as schematically shown in FIGS. 10 and 11. To provide a quick-lock functionality to secure these ends of the flexible ducts to the adapter 10, each connection flange 20 may feature a set of spring loaded locking pins 28 that project from the outer surface 20c of the flange at circumferentially spaced positions therearound to engage in compatible lock openings likewise provided at matching circumferentially spaced intervals in a locking collar fitted around the end 103b of each flexible duct to prevent inadvertent slippage of the duct end 103b off the connection flange 120. Such collar and pin locking mechanisms are known in the art of portable heating equipment, and thus not illustrated in the drawings or described herein in further detail. With the flexible ducts connected between the construction heater and the connection adapter 12, operation of the heater thus conveys heated air therefrom to the inlet openings 24 of the connection adapter 12, which fluidly communicate with the rear opening 26 of the connection adapter via the primary opening 22 in the face plate 16. Accordingly, the hot air entering the inlet openings 24 of the connection adapter 12 from the flexible ducts 103 flows onward through the outer areas of the primary opening 22, and then exits the connection adapter 12 through the rear opening 26 thereof.

During this flow of hot air through the connection adapter 12, supplemental ambient air from the surrounding environment is entrained into this airflow through the truncated central area of the primary opening 22. In addition to the primary opening 22 shared by the two inlets, the face plate 16 of the illustrated embodiment also features a set of additional ambient air openings 30 that reside at separate and distinct areas spaced outwardly from the primary opening 22. The illustrated example features eight such ambient air openings 30, generally arranged in two groups of four, with each group being clustered around a respective one of the two outer areas of the primary opening 22. In the illustrated example, each group features two ambient air openings above the respective outer area of the primary opening 22, and another two ambient air openings therebelow. It will be appreciated however that the quantity and location of these ambient air openings may be varied. The unoccupied central area of the primary opening 22 and the set of additional ambient air openings thus collectively define an ambient air intake by which ambient air from the surrounding environment supplements the heated air from the portable construction heater, thereby ensuring a sufficient supply of intake air to the aeration fan. The ambient air intake may include at least one adjustably sized opening to enable operator control over the mixture of heated air and ambient air to achieve optimal operating conditions.

If the rear opening 26 of the connection adapter 12 is of a compatible size relative to the air intake of a grain bin's existing aeration fan, then the connection adapter may be used on its own in a first mode of operation without the additional/optional sizing adapter 14. For example, a grain bin aeration whose air intake is similarly sized to the rear opening 26 of the connection adapter 12 would be well suited for first this mode of operation, as the air intake of the grain bin aeration fan would occupy an entirety or near entirety of the rear opening 26 of the connection adapter when placed in working relation against or over the fan intake. On the other hand, direct use of the connection adapter 12 alone without the optional sizing adapter 14 would not be as well suited for smaller grain bin aeration fans whose intake would only occupy a notably smaller fraction of the rear opening 26 of the connection adapter 12 when placed in such working relation to the fan, as this would mean that a notable fraction of the heated air might be exhausted to the ambient environment rather than into the fan intake due to the oversized character of the connection adapter's rear opening 26 relative to the fan intake size. Accordingly, the illustrated embodiment includes the additional sizing adapter 14 by which the adapter device 10 can be adapted to better fit a smaller grain bin aeration fan.

The illustrated sizing adapter 14 is substantially constituted by a conically tapered peripheral wall 32 that shares the same central longitudinal axis $A_L$ as the connection adapter when mated thereto in a working position aligned therewith for use on a grain bin aeration fan. The tapered peripheral wall 32 has a greater diameter at a proximal end 34 thereof that faces the connection adapter 12 than at an opposing distal end 36 that faces away from the connection adapter 12. The wider proximal end 34 of the peripheral wall 32 delimits a proximal intake opening 38 of the sizing adapter, the diameter of which therefore exceeds the diameter of a smaller distal outlet opening 40 that's delimited by the narrower distal end 36 of the peripheral wall 32. The outer diameter of the peripheral wall 32 at the proximal end 34 thereof is slightly lesser than the inner diameter of the circumferential wall 18 of the connection adapter 12. This way, the proximal end 34 of the sizing adapter 14 is insertable through the rear opening 26 of the connection adapter 12 into the internal space thereof delimited by the circumferential wall 18.

This inserted state of the sizing adapter 14 is referred to herein as a working position of the sizing adapter, and is illustrated by the assembled state of the two adapters in FIGS. 3 to 8. During use of the adapter device 10 with the sizing adapter 14 in this working position, heated air received in the internal space of the connection adapter 12 through the inlet openings 24, along with the supplemental ambient air entrained into this heated air stream via the ambient air intake 22, 30 of the connection adapter 12, enters the sizing adapter 14 through the proximal opening 38 thereof and flows onwardly therethrough to exit the adapter device 14 and enter the intake of a grain bin aeration fan via the smaller distal opening 40 of the sizing adapter 14.

In the above described first mode of operation, where the connection adapter 12 is used in isolation without the optional sizing adapter 14, the rear end of the connection adapter 12 and the large rear opening 26 delimited thereby defines a final outlet end of the adapter device 10 through which air exits the device 10 and enters the aeration fan's intake. However, the sizing adapter 14 enables a second mode of use on smaller aeration fans whose air intakes are of lesser diameter and thus rendered less compatible with the large rear end of the connection adapter 12. The tapered shape of the frustoconical peripheral wall 32 of the sizing adapter 14 provides a smoothly angled reduction in the device's diameter from the relatively large rear end of the connection adapter 12 down to the smaller distal end 36 of the sizing adapter 14, which in the second mode of operation thus defines the final outlet end of the adapter device 10 that feeds into the air intake of the aeration fan.

In some embodiments, the proximal end 34 of the sizing adapter 14 may be between 28 and 30 inches in order to fit within the similarly sized rear end of the connection adapter. In one embodiment, the proximal end 34 of the sizing adapter 14 is 28.25 inches in diameter in order to fit within a 29-inch rear opening of the connection adapter 12, while the distal end 36 of the sizing adapter is between 22 and 25 inches, for example 23.25 inches in one particular instance. In such embodiments, the use of the connection adapter 12 alone in the first mode of operation is well suited to smaller aerations fans having a 24-inch intake diameter, while the additional use of the sizing adapter 14 in the second mode of operation is well suited to larger aeration fans having a 28-inch intake diameter. Additional sizing adapters of varying taper angle and/or length to accomplish different distal end diameters at the final outlet of the device may be substituted to accommodate use of the same connection adapter 12 on other fan sizes. This way, the connection adapter 12 serves as a universal component sold to the customer in every instance, whereas the size of aeration fan for the customer's intended application dictates whether a sizing adapter 14 is needed, and which model among differently sized sizing adapters is appropriate.

To hold the two adapters 12, 14 together in the assembled state thereof, the illustrated connection adapter 12 features two retention tabs 42 affixed to the terminal end 18a of the circumferential wall 18. The tabs 42 are situated at symmetrically disposed locations on opposite sides of the midplane $P_M$ on an upper span of the circumferential wall 18. Both tabs 42 project a short distance inwardly from the circumferential wall 18 toward the central longitudinal axis $A_L$. Two retention bars 44 are affixed to the outer surface of the sizing adapter's peripheral wall 32 at an upper span thereof, and are likewise symmetrically positioned across the midplane $P_M$ from one another at an angular spacing around the central axis matching that of the retention tabs 42 on the connecting adapter.

To install the sizing adapter 14 on the connection adapter 12, the top end of the sizing adapter 14 is tilted toward the connection adapter 12 and through the rear opening 26 thereof into the interior space just below the retention tabs 42. The bottom end of the sizing adapter 14 is then pushed forwardly through the rear opening 26 of the connection adapter 12 into the interior space thereof, while simultaneously lifting the sizing adapter 14 slightly so as to raise the retention bars 44 up into respective locking positions behind the retention tabs 42. With the lifting action released, the weight of the sizing adapter 14 then rests on the bottom span of the connection adapter's circumferential wall 18, where the proximal edge of the sizing adapter's peripheral wall 32 frictionally bites into the connection adapter's circumferential wall to frictionally prevent the bottom of the sizing adapter 14 from slipping out of the connection adapter 12. Meanwhile, the retention tabs 42 protruding inwardly and downwardly from the upper span of the connection adapter's circumferential wall 18 act to block the corresponding retention bars 44 on the sizing adapter 14 from slipping rearwardly out of the connection adapter 12. This blocks the top of the sizing adapter 14 from tilting backward out of its mating working position within the connection adapter 12. The assembled state of the two adapters is thus self-maintained without requiring use of any external fasteners, thus enabling fast, convenient, tool-free assembly of the two-piece device 10 at the grain bin site if required.

The illustrated sizing adapter 14 also features a lifting lug 46 affixed to the outer surface of the tapered peripheral wall 32 at an upper apex thereof that resides at the midplane $P_M$ of the device, whereby the lifting lug 46 is centered between the two retention bars 44. The hanging lug 46 can be used to lift and suspend the sizing adapter, for example free-hanging support thereof in a painting or coating process during the manufacture of the device.

The hanging lug 46 may also serve as an alignment guide for assembly of the two adapters 12, 14 due to its centered position between the retention bars 44 at the upper apex of the sizing adapter, whereby alignment of the hanging lug 46 with the upper apex of the connection adapter 12 (for example using a corresponding center mark thereon), serves to confirm alignment of the retention bars 44 with the retention tabs 42 during assembly. As opposed to a purely visual alignment guide, the centered hanging lug 46 on the sizing adapter and corresponding center mark on the connection adapter may physically mate with one another to provide a more positive alignment tool. As illustrated, this may be accomplished by using a physical slot cut 48 into the terminal end 18a of connection adapter's circumferential wall 18 at the apex thereof to accommodate insertion of the lifting lug 46 into the slot 48 during tilted insertion of the sizing adapter's upper end into the connection adapter 12, thereby automatically aligning the retention bars 44 with the retention tabs 42 during this insertion.

FIG. 11 shows a variant of the sizing adapter 14', of which the hanging lug and retention bars have been omitted for illustrative simplicity. This modified sizing adapter 14' differs from that of the other figures in that instead of the tapered peripheral wall 32' being of solid, continuous, unperforated structure from end to end and around the full circumference thereof, the tapered peripheral wall is of perforated construction having a series of air intake holes 50 arrayed at regular intervals around the circumference thereto form additional ambient air intakes through which more ambient air can be entrained into the heated air passing through the size adapter on its way into the air intake of the grain bin aeration fan.

FIG. 9 illustrates installation of the adapter device 10 on an existing side-intake centrifugal fan 102 of a grain bin 106. The outlet end of the adapter device is placed in alignment over the air intake 108 of the fan 102, and the device 10 is secured to the fan housing 110 in this position. Such securement may be achieved, for example, by strapping the device 10 in place using one or more ratchet straps 112 or other flexible securing members wrapped over the front face 16a of the connection adapter's face plate 16 between the two connecting flanges 20 and around the far side of the fan housing 110 situated opposite the intake 108. Such strapped securement enables quick and easy mounting of the adapter device in place on place on the fan housing to achieve a suitable working relation between the adapter device and fan. Such strapped installation enables universal, tool-free installation that is not dependent on the particular shape or availability of bolting locations on different models and sizes of fans. However, it will be appreciated that other mounting options may alternatively be employed. With the adapter device mounted in working relation to the fan, two flexible heater ducts 103 have their first ends 103a thereof coupled to the two-outlets 104 of the construction heater 100, and their second ends 103b coupled to the connection flanges 20 of the two inlets of the connection adapter 12.

To control the heater, the adapter device 10 is accompanied by electronic heater control components, preferably including at least a temperature probe and a thermostat controller. The temperature probe 112 is installed somewhere in the airflow path from the heater into the grain bin, preferably at a location downstream of the fan for optimal control over the air temperature in the grain bin. In the illustrated example of FIG. 9, an access hole 114 is drilled in the air duct 116 that connects the external aeration fan 102 to the interior of the grain bin 106. The probe 112 is mounted in the air duct 116 and communicably connected to a thermostat controller 118, which for example may be mounted to the exterior of the air duct 116 in a suitable weatherproof housing. The controller 118 is communicably connected to a thermostat control input 120 of the construction heater 100 in order control the burner thereof to achieve and maintain a targeted set point temperature at the probe location. The thermostat controller 118 may include a display screen for showing the current probe-detected temperature, and controls for adjustment of the targeted set point temperature. Other embodiments may include additional monitoring and control components for optimizing performance of the in-situ heated grain dryer formed by the installation of the adapter device between the construction heater and the existing aeration fan. Such additional components may include static air pressure tools, infrared laser heat gun temperature gauges, and in-bin temperature and/or humidity sensors. Additional embodiments may include capture and logging of measurement data over time, which can be viewed from an online web portal and/or smart phone application.

FIG. 10 illustrates similar installation of the adapter device and accompanying monitor/control components in the instance of an axial or in-line centrifugal aeration fan 102', where the fan intake 108 is located at a longitudinal end of the fan housing 110' rather than at a lateral side thereof.

The illustrated embodiment of the adapter device 10 employs two connection flanges 20 to provide two separate inlets for respective connection of two flexible heater ducts routed from two outlets of a dual-outlet heater, thus providing compatibility with a notable number of commercially available construction heaters having this dual-outlet configuration. However, other embodiments may have only a single inlet for receiving a singular flexible duct from either a single-outlet construction heater, or from one outlet of a dual-outlet construction heater whose other outlet is being used to likewise pre-heat the intake air of a second aeration fan on another gain bin via a second flexible duct. Such single-inlet adapter devices still benefit from other advantageous features of the present invention, such as the ambient air intake for supplementing the heated air, and the two-piece adapter construction providing adaptability for different fan sizes.

In the case where two grain bins are being heated by the same dual-outlet heater via a pair of respective flexible ducts and adapter devices, the two adapter devices may share a single thermostat controller, while making use of a pair of temperature probes respectively installed in the airflow paths of the two grain bins so that the thermostat controller uses inputs from both bins to control operation of the shared heater. If a dual-inlet adapter device is being used on either of the two grain bins, then only one of the two inlets of that adapter device is used, in which case the second inlet of the adapter device may be left open to supplement the other openings of the ambient air intake, or may be fully or partially closed off by a suitably sized cap or cover that fits over the respective connecting flange of the second inlet. This cap or cover may incorporate an adjustable damper that allows the second inlet to be selectively closed off to varying degrees to adjust the overall open area of the ambient air intake, thus adjustably controlling the volume of ambient air drawn into the adapter.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. In combination:
    a grain bin having an interior space for storing grain therein;
    a grain bin aeration fan mounted externally of said grain bin and comprising an air duct through which forced air is fed into said interior space of the grain bin, and an air intake that is open to a surrounding ambient environment outside said grain bin to draw ambient air therefrom;
    a portable construction heater supported separately and independently of both said grain bin and said grain bin aeration fan at a location situated in the surrounding ambient environment outside said the bin, said portable heater having a plurality of hot-air outlets from which heated air is exhausted during operation of said portable construction heater;
    a plurality of flexible ducts that reside in said surrounding ambient environment outside the grain bin and have first ends configured for selective and respective connection to the hot-air outlets of the portable construction heater; and
    an adapter device having:
        a front end at which a plurality of inlet openings are neighbored by respective connection flanges that are configured and compatibly sized relative to the flexible ducts to receive selective and respective fitting of second ends of said flexible ducts over the respective connection flanges in positions placing said second ends of the flexible ducts in aligned relation over the inlet openings to direct the heated air from the portable construction heater through said inlet openings;
        an outlet end having an outlet opening of different and greater size than each of said inlet openings at the front end, said outlet opening being sized and configured for placement over the air intake of the grain bin aeration fan in a position in which at least a majority area of the air outlet opening is occupied by air intake of the grain bin aeration fan.

2. The combination of claim 1 wherein a front face of the adapter device partially closes off the front end thereof and has different areas respectively occupied by the inlet openings, and each inlet opening overlies a respective portion of a shared opening in said front face of the adapter device.

3. The combination of claim 2 wherein the inlet openings collectively occupy a less than entirety of said shared opening, an unoccupied area of which at least partially defines an ambient air intake of the adapter device.

4. The combination of claim 2 wherein the front face of the adapter device has at least one additional opening therein at one or more regions thereof that are separate and distinct from the shared opening, and are unoccupied by the inlets to admit ambient air through said additional opening.

5. The combination of claim 1 wherein each connection flange protrudes from a front face of the adapter device that partially closes off the front end thereof around the inlet openings, and each connection flange spans fully around a respective one of the inlet openings.

6. The combination of claim 2 wherein each connection flange protrudes outwardly from said front face around the respective portion of the shared opening.

7. The combination of claim 1 wherein the adapter device comprises a tapered section that narrows in width toward the outlet end.

8. The combination of claim 6 wherein the tapered section is conically tapered.

9. The combination of claim 7 wherein the tapered section defines the outlet end of the adapter device.

10. The combination of claim 1 wherein the inlet openings have respective inlet diameters each corresponding to a predetermined size of flexible duct, and a sum of the inlet diameters exceeds a diameter of the outlet opening at the outlet end.

11. The combination of claim 1 wherein the adapter device is of a multi-piece structure comprising a connection adapter that defines the front end, and a discrete sizing adapter that defines the outlet end.

12. The combination of claim 11 wherein the connection adapter has an outer diameter that exceeds a diameter of the sizing adapter at the outlet end.

13. The combination of claim 11 wherein a proximal end of the sizing adapter situated oppositely of the outlet end of the adapter device is received or receivable in a rear end of the connection adapter situated oppositely of the front end.

14. The combination of claim 11 wherein the connection adapter and the sizing adapter are matable together in a self-locking manner free of any external fasteners.

15. A method of providing differently sized adapter products for connecting portable heaters to air intakes of differently sized grain bin aeration fans, said method comprising:
    (a) manufacturing or acquiring:
        a plurality of connection adapters each having:
            a front end equipped with at least one inlet for selective connection of a respective flexible duct thereto from a heater in order to convey heated air from said heater to said inlet; and
            a rear end situated oppositely of said front end and having a rear opening in fluid communication with each inlet to enable exhaust of said heated air from through said rear opening; and
        a plurality of sizing adapters each having:
            a proximal end configured for selective coupling with the rear end of any of the connection adapters in a working position, said proximal end having a proximal opening that is positioned to fluidly communicate with an interior space of said any of the connection adapters when in the working position; and
            a distal end situated oppositely of the proximal end and having a distal opening that fluidly communicates with the proximal opening to enable flow of the heated air from the interior space of said any of the connection adapters when in the working position, the distal opening being of different diameter than the rear opening of said any of the connection adapters; and (b) from the connection and sizing adapters, compiling different adapter options for different sizes of grain bin aeration fans, said different adapter options including at least two of the following:

(i) a first single-piece adapter comprising a connection adapter unaccompanied by any of the sizing adapters, wherein the rear opening of the connection adapter is compatibly sized relative to an air intake of a first size of grain bin aeration fan;

(ii) a second multi-piece adapter comprising a connection adapter accompanied by a sizing adapter whose distal opening is compatibly sized relative to the air intake of a different second size of grain bin aeration fan; and (iii) a third multi-piece adapter comprising a connection adapter accompanied by a different sizing adapter whose distal opening is compatibly sized relative to the air intake of a different third size of grain bin aeration fan.

16. The method of claim 15 wherein the distal opening of each sizing adapter is of lesser diameter than the rear opening of each connection adapter.

17. The method of claim 15 wherein the rear opening of each connection adapter is of greater diameter than each inlet at the front end thereof.

18. The method of claim 15 wherein, for at least one of said connection adapters, the at least one inlet thereof comprises two inlets having respective inlet diameters, and a diameter of the rear opening of said at least one of the connection adapters equals or exceeds a sum of said inlet diameters.

19. In combination:
a grain bin having an interior space for storing grain therein;
a grain bin aeration fan mounted externally of said grain bin and comprising an air duct through which forced air is fed into said interior space of the grain bin, and an air intake that is open to a surrounding ambient environment outside said grain bin to draw ambient air therefrom;
a portable construction heater supported separately and independently of both said grain bin and said grain bin aeration fan at a location situated in the surrounding ambient environment outside the grain bin, said portable construction heater having at least one hot-air outlet from which heated air is exhausted during operation of said portable construction heater;
at least one flexible duct that resides in said surrounding ambient environment outside the grain bin and has a first end configured for selective and respective connection to a respective hot-air outlet of the portable construction heater; and
an adapter device having:
a front end at which at least one inlet opening is neighbored by a respective connection flange that is configured and compatibly sized relative to a respective flexible duct to receive selective and respective fitting of a second end of said respective flexible duct over the respective connection flange in a position placing said second end of the respective flexible duct in aligned relation over the inlet opening to direct the heated air from the portable construction heater through said inlet opening; and
an outlet end having an outlet opening of different and greater size than said inlet opening at the front end, said outlet opening being sized and configured for placement over the air intake of the grain bin aeration fan in a position in which at least a majority area of the air outlet opening is occupied by air intake of the grain bin aeration fan;
wherein the adapter device further comprises at least one ambient air intake positioned relative to the inlet opening so as to be left uncovered the second end of the flexible duct when fitted over the respective connection flange of the inlet opening, whereby unheated ambient air is admissible into the adapter device to supplement and mix with the heated air received through the flexible duct to ensure a sufficient supply of intake air to the grain bin aeration fan.

20. An apparatus for connecting a portable construction heater to a grain bin aeration fan, said apparatus comprising an adapter device having a front end at which at least one inlet is configured for selective of a respective flexible duct from a respective outlet of the portable construction heater, and an outlet end for placement in working relation to an air intake of the grain bin aeration fan, wherein the adapter device comprises a front face partially closing off the front end thereof, each inlet comprises a respective inlet opening passing through said front face and a connection flange that projects from said front face around the respective inlet opening and is sized for receipt of an end of the respective flexible duct in fitted relation over said connection flange in a position placing said end of the respective flexible duct in aligned relation over the inlet opening to direct the heated air from the portable construction heater through said inlet opening, and said outlet end of the of the adapter device comprises an outlet opening that is of different and greater size than said inlet opening, and is sized and configured for placement over the air intake of the grain bin aeration fan in a position in which at least a majority area of the air outlet opening is occupied by the air intake of the grain bin aeration fan.

* * * * *